US012718670B2

(12) United States Patent
van Apeldoorn

(10) Patent No.: US 12,718,670 B2
(45) Date of Patent: Aug. 25, 2026

(54) METHODS AND SYSTEMS FOR GENERATING HAPTIC SIGNALS

(71) Applicant: Sonos, Inc., Santa Barbara, CA (US)

(72) Inventor: Naphur van Apeldoorn, Amsterdam (NL)

(73) Assignee: Sonos, Inc., Goleta, CA (US)

( * ) Notice: Subject to any disclaimer, the term of this patent is extended or adjusted under 35 U.S.C. 154(b) by 100 days.

(21) Appl. No.: 18/475,905

(22) Filed: Sep. 27, 2023

(65) Prior Publication Data

US 2024/0119813 A1 Apr. 11, 2024

Related U.S. Application Data

(60) Provisional application No. 63/377,805, filed on Sep. 30, 2022.

(51) Int. Cl.
*G08B 6/00* (2006.01)
*G08B 3/10* (2006.01)

(52) U.S. Cl.
CPC *G08B 6/00* (2013.01); *G08B 3/10* (2013.01)

(58) Field of Classification Search
CPC .................................... G08B 6/00; G08B 3/10
USPC ....................................................... 340/407.1
See application file for complete search history.

(56) References Cited

U.S. PATENT DOCUMENTS 5,440,644 A 8/1995 Farinelli et al.
5,761,320 A 6/1998 Farinelli et al.
5,923,902 A 7/1999 Inagaki
6,032,202 A 2/2000 Lea et al.
6,256,554 B1 7/2001 DiLorenzo
6,404,811 B1 6/2002 Cvetko et al.
6,469,633 B1 10/2002 Wachter
6,522,886 B1 2/2003 Youngs et al.
6,611,537 B1 8/2003 Edens et al.
6,631,410 B1 10/2003 Kowalski et al.
(Continued)

FOREIGN PATENT DOCUMENTS

EP 1389853 A1 2/2004
WO 200153994 7/2001
WO 2003093950 A2 11/2003

OTHER PUBLICATIONS

AudioTron Quick Start Guide, Version 1.0, Mar. 2001, 24 pages.
(Continued)

*Primary Examiner* — Jack K Wang
(74) *Attorney, Agent, or Firm* — Fortem IP LLP

(57) ABSTRACT

There is provided a haptic system, comprising: a housing, two drive units coupled to the housing, each drive unit comprising a mass movable relative to the housing, and a controller configured to generate a haptic signal by causing at least one drive unit to exert a net force to be exerted on the housing. There is also provided a method for providing a haptic signal comprising: generating a first haptic signal, using a haptic system, after a first interaction with a user interface element; and generating a second haptic signal, using the haptic system, after a second interaction with the user interface element; wherein the second haptic signal is different from the first haptic signal; and wherein the first and second haptic signals are at least one of: associated with different functions of the user interface element; and associated with a parameter adjusted by the user interface element.

20 Claims, 11 Drawing Sheets

(56) References Cited

U.S. PATENT DOCUMENTS

| | | | | |
|---|---|---|---|---|
| 6,757,517 | B2 | 6/2004 | Chang | |
| 6,778,869 | B2 | 8/2004 | Champion | |
| 7,130,608 | B2 | 10/2006 | Hollstrom et al. | |
| 7,130,616 | B2 | 10/2006 | Janik | |
| 7,143,939 | B2 | 12/2006 | Henzerling | |
| 7,236,773 | B2 | 6/2007 | Thomas | |
| 7,295,548 | B2 | 11/2007 | Blank et al. | |
| 7,391,791 | B2 | 6/2008 | Balassanian et al. | |
| 7,483,538 | B2 | 1/2009 | McCarty et al. | |
| 7,571,014 | B1 | 8/2009 | Lambourne et al. | |
| 7,630,501 | B2 | 12/2009 | Blank et al. | |
| 7,643,894 | B2 | 1/2010 | Braithwaite et al. | |
| 7,657,910 | B1 | 2/2010 | McAulay et al. | |
| 7,853,341 | B2 | 12/2010 | McCarty et al. | |
| 7,987,294 | B2 | 7/2011 | Bryce et al. | |
| 8,014,423 | B2 | 9/2011 | Thaler et al. | |
| 8,045,952 | B2 | 10/2011 | Qureshey et al. | |
| 8,103,009 | B2 | 1/2012 | McCarty et al. | |
| 8,234,395 | B2 | 7/2012 | Millington | |
| 8,483,853 | B1 | 7/2013 | Lambourne | |
| 8,942,252 | B2 | 1/2015 | Balassanian et al. | |
| 10,395,489 | B1 * | 8/2019 | Cruz-Hernandez | G06F 3/016 |
| 10,631,096 | B1 * | 4/2020 | Garcia Selva | H04R 1/2873 |
| 2001/0042107 | A1 | 11/2001 | Palm | |
| 2002/0022453 | A1 | 2/2002 | Balog et al. | |
| 2002/0026442 | A1 | 2/2002 | Lipscomb et al. | |
| 2002/0124097 | A1 | 9/2002 | Isely et al. | |
| 2003/0157951 | A1 | 8/2003 | Hasty, Jr. | |
| 2004/0024478 | A1 | 2/2004 | Hans et al. | |
| 2007/0142944 | A1 | 6/2007 | Goldberg et al. | |
| 2014/0211963 | A1 * | 7/2014 | Dodd | H04R 1/2896 381/94.1 |
| 2019/0261088 | A1 * | 8/2019 | Sheffield | G10K 11/17883 |
| 2020/0227020 | A1 * | 7/2020 | Landig | G10K 11/1785 |
| 2022/0189262 | A1 * | 6/2022 | Hockman | G08B 6/00 |
| 2022/0337956 | A1 * | 10/2022 | Ilkorur | H04R 9/025 |
| 2023/0086204 | A1 * | 3/2023 | Amin-Shahidi | H02K 33/02 310/15 |
| 2023/0090674 | A1 * | 3/2023 | Lee | G06F 3/016 340/407.1 |
| 2024/0303939 | A1 * | 9/2024 | Briel | G06F 3/016 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *D&M Holdings* (No. 14-1330-RGA), Di 219, Claim Construction Opinion (Jan. 12, 2017) (24 pages).
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

METHODS AND SYSTEMS FOR GENERATING HAPTIC SIGNALS

CROSS-REFERENCE TO RELATED APPLICATION

This application claims the benefit of priority to U.S. Patent Application No. 63/377,805, filed Sep. 30, 2022, which is incorporated herein by reference in its entirety.

FIELD OF THE DISCLOSURE

The present disclosure is related to consumer goods and, more particularly, to methods, systems, products, features, services, and other elements directed to generating haptic signals or some aspect thereof.

BACKGROUND

Haptic signals are useful in electronic devices. Through haptics, a user interacting with a device experiences a motion or movement from the device. The motion may give the user the feeling of a pressing a button when no physical button is present, for example. Commonly, devices generate haptics using a haptic system or generator in the form of a linear resonant actuator (LRA) or an eccentric rotating mass vibration motor (ERM). LRAs can be made small and compact, lending themselves to use in electronic devices, and are able to respond quickly. However, they rely on resonance to generate a haptic signal, meaning they are limited to generating signals at resonance. ERMs make use of a rotating mass to provide haptic signals, so are able to provide signals at a wider range of frequencies, but are typically less responsive and cannot vary amplitude independently of the frequency. Accordingly, variability in haptics in electronic devices is limited and unsophisticated.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

DETAILED DESCRIPTION

I. Overview

Figure 1:
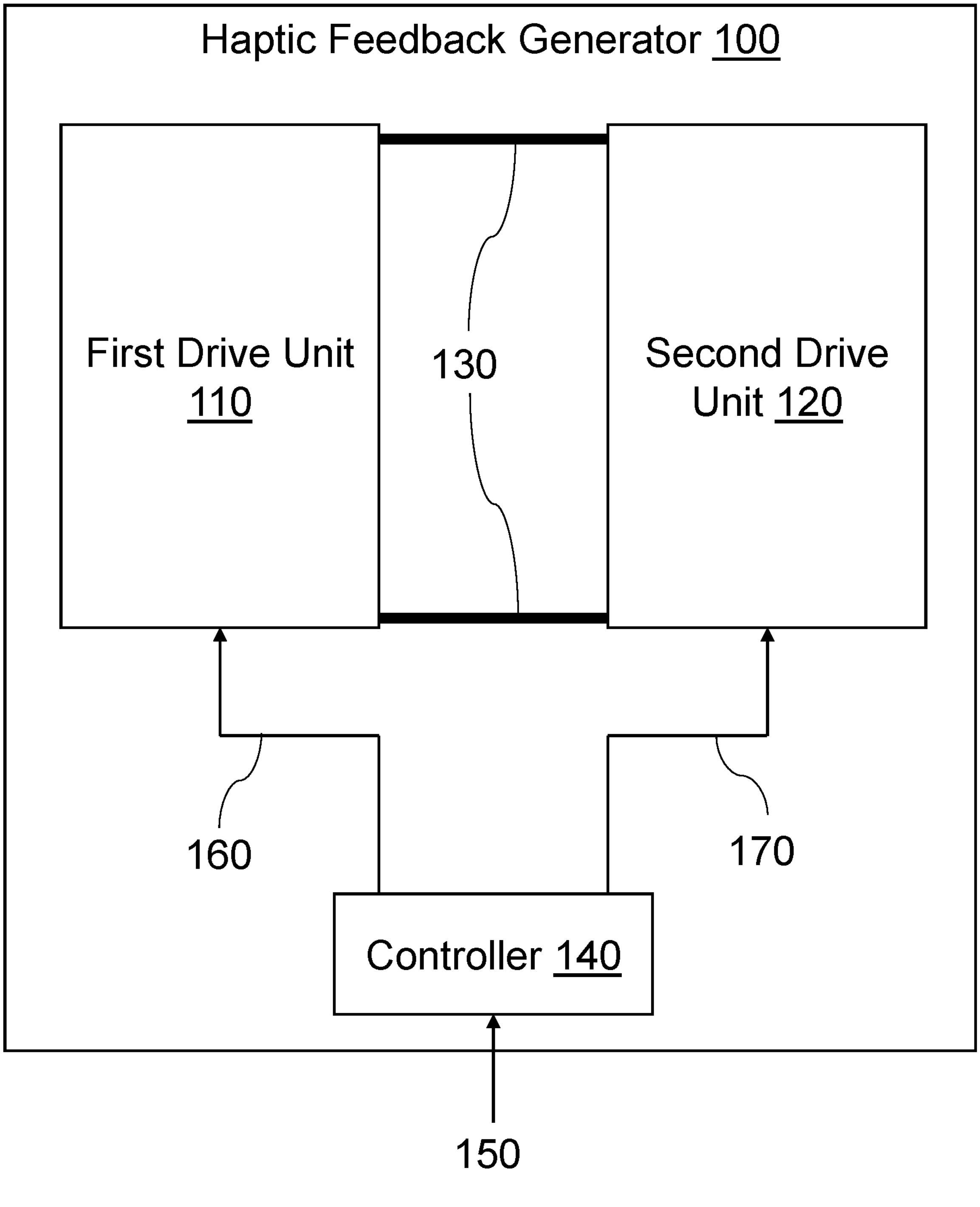
FIG. 1 is a block diagram of an example of a haptic system.

Embodiments described herein relate to haptic systems. Further embodiments relate to controllers for controlling haptic systems, devices including the haptic systems and/or controllers, and methods of use of the haptic systems, controllers, and/or devices.

Generally, haptic systems, which may also be described as haptic signal generators or haptic generators, as described herein provide greater variability in haptic signals. In some examples, the haptic systems may enable the frequency and/or amplitude of a haptic signal to be varied. In some examples, the frequency and amplitude may be independently varied. When the duration of a haptic signal is also variable, the haptic signal may be variable in three different ways: duration, frequency, and amplitude. Variability in haptic signals may allow a greater range in the types of signal that can be provided. A haptic signal or a plurality of haptic signals may also be referred to as haptic feedback.

Variability in haptic signals is particularly useful for when a user interacts with a device. For example, a device may have a number of different input mechanisms controlling different functions. Allowing different haptic signals to be assigned to each input mechanism is useful to allow a user to differentiate between the functions they are controlling. In some examples, a single input mechanism may control more than one function. For example, a button may control play and also control pause of an audio signal, or a slider may control both increasing and decreasing volume. Using a haptic system can provide different haptic signals for each of the different functions may allow the user to distinguish which function has been activated or controlled. For example in audio implementations, pressing a play/pause button may not immediately yield an audible response to whether the play function or the pause function was activated by the press. A play function may not be followed by audio output if there is a period of silence at the beginning of a song, during buffering before playback or if volume is set very low Likewise, a pause function may not be immediately apparent if the button pressed during a period of silence or during very low volume playback.

To achieve variability in haptic signals as described above, a haptic system may make use of imbalances between two or more moving masses to generate a haptic signal. The masses may be arranged relative to one another so that their movement can also be balanced, thereby creating no haptic signal. In some embodiments, the haptic system may make use of interference to provide cancellation and/or reinforcement between the movement of the masses.

The haptic system may also be configured to provide variability in the location of the haptic signal it produces. Such variation is useful where an input mechanism has a variable location, such as a slider, or where a number of input mechanisms are provided across a particular surface, such that the signal may be provided generally at the position of the specific input mechanism with which a user interacts. One such configuration to locate a haptic signal at a predetermined position provides at least two sets of masses that create imbalances separately. The relative haptic signals generated by each of the least two set of masses can combine so that an apparent location is based on a resultant or net signal from the at least two sets of masses. The sets of masses may also make use of interference.

The haptic system may also be configured to provide other signals in addition to haptic signals. In a particular example, the haptic system may be configured to generate haptic signals and audio signals. Providing audio signals in addition to haptic signals further enhances the range of signals that can be provided to a user of a device, with further variation being possible when the user interacts with an input mechanism. Furthermore, providing the capability to generate audio may allow for the haptic system to output audio at the same time as providing a haptic signal. This provides advantages because it allows the haptic system to be incorporated into and used as part of a playback device. Such a combination of audio and haptic signals may be achieved by using an imbalance between at least two speaker diaphragms to generate the haptic signal.

An example haptic system may comprise a housing, at least two drive units (such as a first drive unit and a second drive unit), and a controller. The at least two drive units are coupled to the housing. Each drive unit comprises a mass movable relative to the housing. The controller is configured to generate a haptic signal by causing at least one of the at least two drive units to exert a net force on the housing.

The controller may be configured to generate a haptic signal by causing each of the at least two drive units to exert a net force on the housing. In other words, the controller may be configured to control at least one of or each of the at least two drive units to generate a haptic signal by causing a net force to be exerted on the housing by the at least two drive units.

The at least two drive units may comprise speaker diaphragms and the controller may be configured to control the at least two drive units to generate audio. For example, the first drive unit may comprise a first speaker diaphragm and the second drive unit may comprise a second speaker diaphragm. The controller may be configured to control the at least two drive units to generate audio and the haptic signal simultaneously and/or to determine that an excursion of the at least two drive units exceeds a threshold and responsively reduce at least one of a magnitude of the haptic signal and an amplitude of the audio.

The drive units may be positioned to generate the haptic signal substantially without sound by cancellation of sound waves generated by the speaker diaphragms. The controller may be configured to generate the haptic signal substantially without sound by driving the first and second drive units such that sound waves generated by the first speaker diaphragm are cancelled by sound waves generated by the second speaker diaphragm.

The speaker diaphragms may be coaxial. The first speaker diaphragm may be coaxial with the second speaker diaphragm, and may be positioned back-to-back or face-to-face. The haptic system may comprise two coaxial drive units. The coaxial drive units may be positioned back-to-back or face-to-face.

The at least two drive units may form a first set of drive units and the haptic system may comprise a second set of drive units including at least two further drive units, each drive unit comprising a mass movable relative to the housing. These first and second sets of drive units may be spaced from one another. The controller may be configured to control the first and second sets of drive units to provide a haptic signal at a position between them.

An example method for providing a haptic signal using a haptic system as described above may comprise: generating a haptic signal by causing or controlling at least one of the at least two drive units to exert a net force on the housing of the haptic system. The method may comprise generating the haptic signal by causing or controlling each of the at least two drive units to exert a net force on the housing of the haptic system.

Where the at least two drive units comprise speaker diaphragms, the method may further comprise controlling the at least two drive units to generate audio. The drive units may be controlled to generate audio with or without generating a haptic signal.

The method may comprise controlling the at least two drive units to generate audio and the haptic signal simultaneously.

The method may comprise: determining that an excursion of the at least two drive units exceeds a threshold; and responsively reducing at least one of a magnitude of the haptic signal and an amplitude of the audio.

The drive units may be positioned to generate the haptic signal substantially without sound by cancellation of sound waves generated by the speaker diaphragms.

When the at least two drive units form a first set of drive units, and the haptic system comprises a second set of drive units including at least two further drive units, each drive unit comprising a mass movable relative to the housing, and the first and second sets of drive units are spaced from one another, the method may comprise controlling the at least two sets of drive units to provide a haptic signal at a position between the first set of drive units and the second set of drive units.

An example computer-readable medium may comprise instructions, which, when executed by a processor, cause the processor to carry out a method for providing a haptic signal using a haptic system as described above. The computer-readable medium may be a non-transitory computer-readable medium.

An example method of providing haptic feedback comprises: generating a first haptic signal, using a haptic system, after a first interaction with a user interface element; and generating a second haptic signal, using the haptic system, after a second interaction with the user interface element; wherein the second haptic signal is different from the first haptic signal; and wherein the first haptic signal and the second haptic signal are at least one of: associated with different functions of the user interface element; and associated with a parameter adjusted by the user interface element.

The second haptic signal may differ from the first haptic signal in at least one of frequency, magnitude, and duration. At least one of the first haptic signal and the second haptic signal may have a frequency and/or magnitude that changes over time.

When the haptic system comprises at least two movable masses coupled to a housing, the steps of generating the first haptic signal and generating the second haptic signal may comprise: causing the at least two masses to move independently thereby generating a net force on the housing.

The user interface element may comprise a play button. In that case, the first haptic signal may be associated with starting audio output and the second haptic signal may be associated with ceasing audio output.

The user interface element may comprise a switch. In that case, the first haptic signal may be associated with a parameter controlled by the switch indicating "true", also referred to as "on" or "active", and the second haptic signal may be associated with the parameter controlled by the switch being "false", also referred to as "off" or "inactive".

The user interface element may be for adjusting a value of a parameter. In that case, the first haptic signal and the second haptic signal may be associated with at least one of: a value of the parameter; and a direction of adjustment of the parameter.

The first haptic signal and the second haptic signal may have a position, also referred to as a location, and the position may be associated with at least one of: a position of the user interface element; and a value of the parameter adjusted by the user interface element. Generating the first haptic signal and the second haptic signal may comprise controlling at least two spatially separated haptic feedback generators to produce a haptic signal at the associated position.

The user interface element may comprise a mechanical or capacitive button.

The method may comprise: generating a first sound, using the haptic system, after the first interaction with the user interface element; and generating a second sound, using the haptic system, after a second interaction with the user interface element; wherein the second sound is different to the first sound and the first haptic signal has a different frequency than the first sound.

The method may comprise using the haptic system to generate audio.

An example computer-readable medium may comprise instructions, which, when executed by a processor, cause the processor to carry out a method of providing haptic feedback as described above. The computer-readable medium may be a non-transitory computer-readable medium.

An example system may comprise a processor and a memory that stores instructions, which, when executed by the processor, cause the processor to carry out a method of providing haptic feedback as described above.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, drive unit 110 is first introduced and discussed with reference to FIG. 1. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Example Systems and Devices

FIG. 1 shows a diagrammatic representation of an exemplary haptic system 100. The haptic system 100 is configured to generate a haptic signal. The term "haptic signal" may relate to any movement or motion that a user can experience through touch. The movement may be movement of the haptic system or of a structure to which the haptic system is coupled. The movement may include a vibration, oscillation, force, or other motion.

The haptic system 100 comprises a first drive unit 110 and a second drive unit 120. Although not depicted in FIG. 1, the first and second drive units 110, 120 each comprise at least one mass and at least one actuator for moving the mass. The first and second drive units 110, 120 are coupled by a housing 130. The drive units 110, 120 may be mounted to the housing 130. The housing 130, which may also be referred to as a frame, may comprise a structure of a device within which the drive units 110, 120 are included. The device may, for example, comprise an audio playback device or a mobile device. In some embodiments, the housing 130 may comprise an open frame.

In the example of FIG. 1, the haptic system 100 includes a controller 140. The controller 140 is configured to receive an input signal 150. The haptic signal may be generated in response to the input signal 150. The input signal 150 may be received from a user interface element following an interaction by a user with the user interface element. The user interface element may be an element of a device that includes the haptic system 100. Alternatively, the user interface element may be an element of a device remote from and separate to the device that includes the haptic system 100. For example, a playback device may include the haptic system 100. Interactions by a user with a user interface element of the playback device may cause an input signal 150 to be generated for generation of a haptic signal by the haptic system 100. A user interface element may comprise a touchscreen, a user interface element displayed on a touch screen, a button (physical, capacitive, or virtual on a touchscreen), a switch (physical or on a touchscreen), a slider (physical or on a touchscreen), a key (physical or on a touchscreen), a wheel (physical or on a touchscreen), a dial (physical or on a touchscreen) a microphone, a biometric sensor, a camera, or another element by which input may be received by a user device. Alternatively, or additionally, the input signal 150 may comprise a command signal generated in response to a trigger or event. An example may be receipt of a command signal from a controller associated with the device incorporating the haptic system 100 or a remote device or server. The trigger or event may comprise receiving data from, e.g., a remote server or a remote device. For example, if a mobile device incorporates a haptic system such as haptic system 100, the command signal may be generated in response to receiving message data or an indication that a phone call is being received. The trigger or event may comprise a criteria being fulfilled or a threshold being reached. For example, the trigger may be that a time limit has expired.

The controller 140 is configured to generate a first control signal 160 for controlling the first drive unit 110 and a second control signal 170 for controlling the second drive unit 120. The controller 140 may control the first and second drive units 110, 120 independently by the first and second control signals 160, 170. In some embodiments, the first and second control signals 160, 170 may be the same control signal, such that the drive units 110, 120 are controlled in the same way. In some embodiments, the first and second control signals 160, 170 may be different control signals, to control the drive units 110, 120 independently. The control of the drive units 110, 120 is discussed in more detail below.

The respective actuators of the first and second drive units 110, 120 move their respective masses according to the control signal 160, 170 received. The haptic system 100 is configured to generate a haptic signal in at least the housing 130 by controlling one of or both of the drive units 110, 120 to exert a net force on the housing 130. This may be achieved by an imbalance between the masses of the drive units 110, 120 when they are moved by the actuators. The imbalance may be an imbalance in the masses and/or an imbalance in the forces applied by the masses to the housing while they are actuated. In other words, the masses may be different and therefore generate an imbalance when they move and/or the way the masses are moved may be different and therefore lead to an imbalance.

To explain in more detail, movement of a mass by an actuator creates a force. This force generated by the drive unit(s) on the housing 130 provides a haptic signal. The force created is dependent on the mass, m, and the acceleration of the mass, a:

$$F = ma$$

Therefore, when both drive units 110, 120 are controlled independently, the resulting net force is dependent on the forces independently generated by each drive unit 110, 120. If the first drive unit 110 is assigned the subscript 1, and the second drive unit 120 is assigned the subscript 2, the forces $F_1$ and $F_2$ generated by the first and second drive units 110, 120 respectively are:

$$F_1 = m_1 a_1$$

and $$F_2 = m_2 a_2$$

Depending on the arrangement of the drive units 110, 120 relative to one another, the movement of the masses by the actuators, and the mass of each mass, the forces $F_1$ and $F_2$ may be balanced or unbalanced. When the forces are balanced, the net force on the housing is zero, meaning that no haptic signal is provided. When the forces are imbalanced, the net force on the housing provides a haptic signal.

Figure 2:
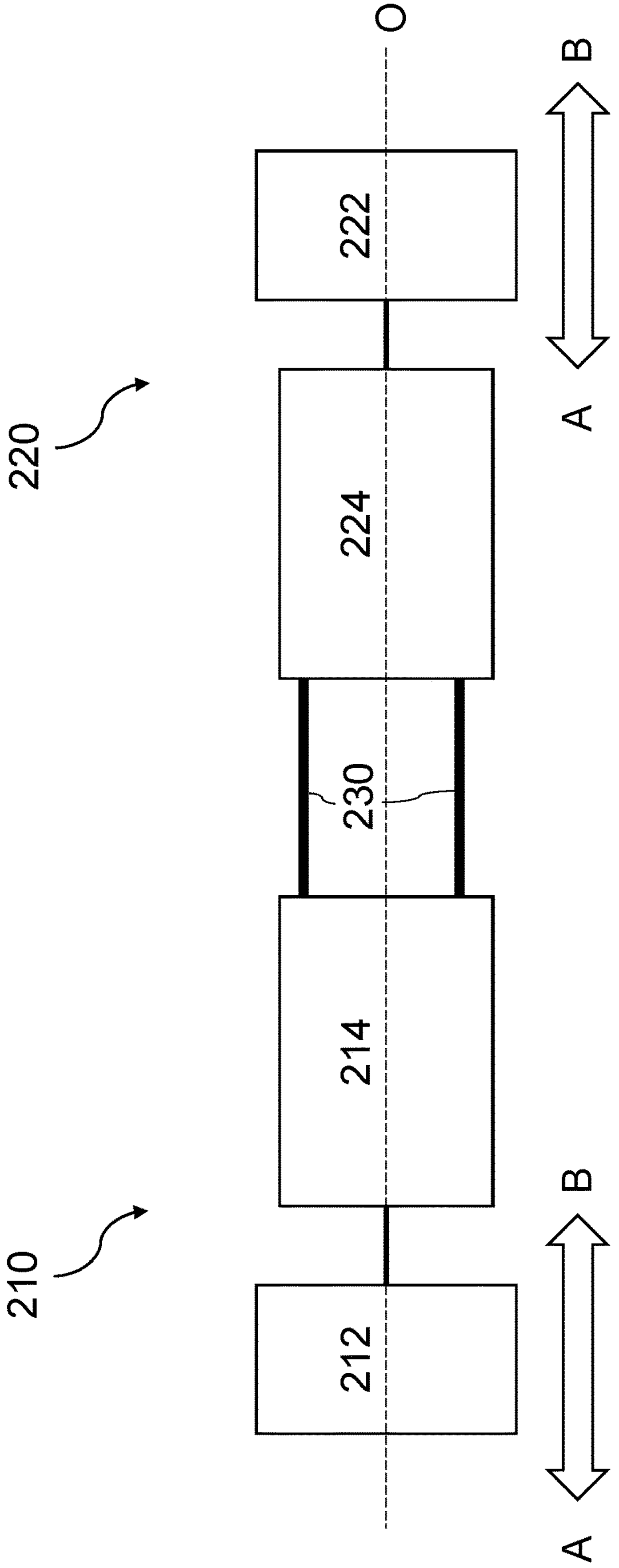
FIG. 2 is an example arrangement of a pair of drive units for the haptic system of FIG. 1.
Figure 3:
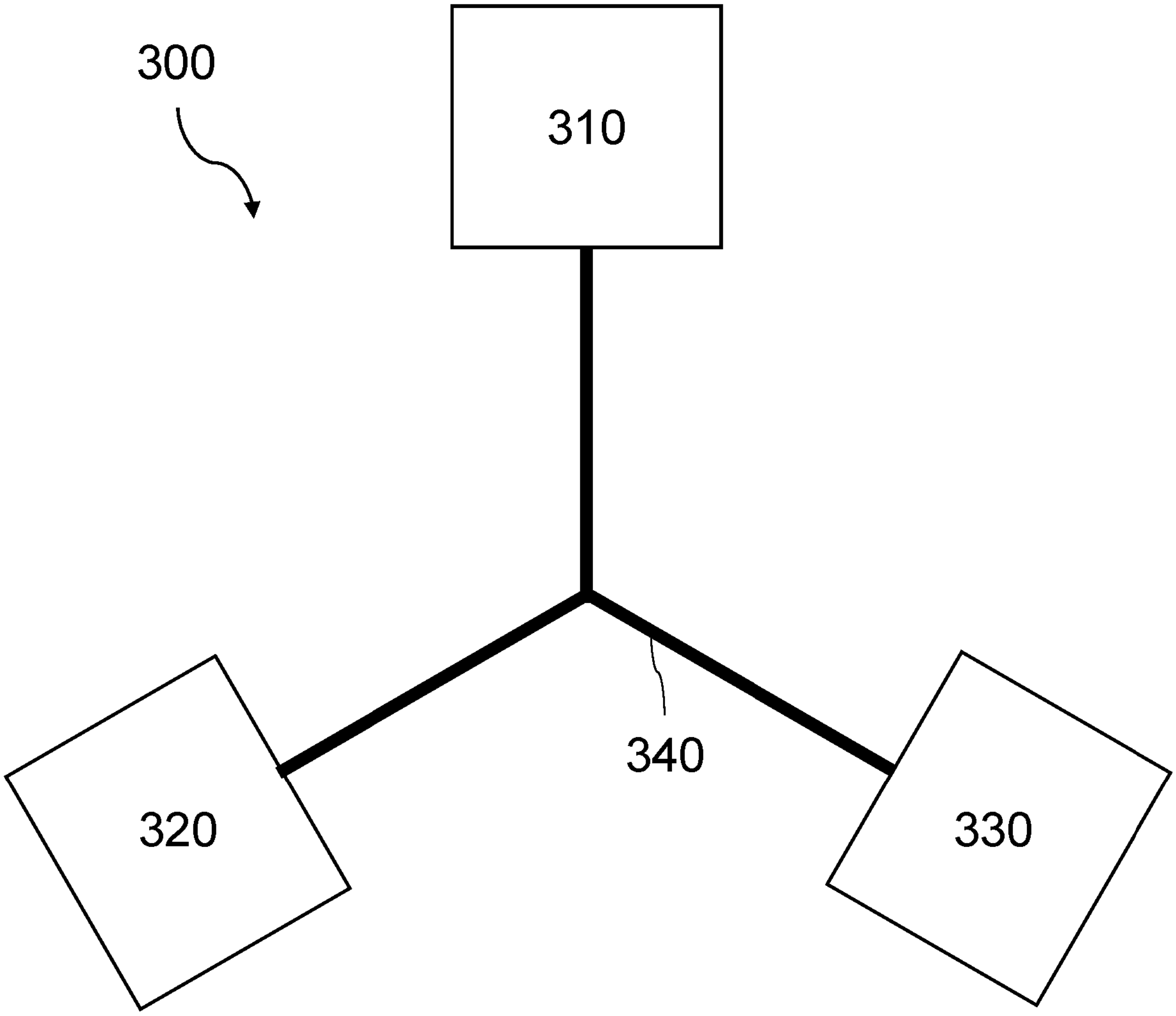
FIG. 3 is an example arrangement of three drive units for the haptic system of FIG. 1.

In some embodiments, the drive units 110, 120 may be arranged such that the movement of the masses is in the same plane. In some of these embodiments, the masses may move along the same axis, as shown in FIG. 2 and described below. In other embodiments, for example where more than two drive units are provided, the masses may move along axes that are symmetrical about a central point. In a particular example, such as is shown in FIG. 3, if three drive units are provided, they may be spaced apart in the same plane such that their respective axes are each separated by 120 degrees.

FIG. 2 shows a diagrammatic representation of an exemplary arrangement of first and second drive units 210, 220. In FIG. 2, the first drive unit 210 comprises a first mass 212 and a first actuator 214, and the second drive unit 220 comprises a second mass 222 and a second actuator 224. As in FIG. 1, the drive units 210, 220 are coupled together by a housing 230. The housing 230 couples the two actuators 214, 224 together in the embodiment of FIG. 2, but in other examples the drive units 210, 220 may be coupled together and to the housing 230 via their masses 212, 224.

In the example of FIG. 2, the masses 212, 222 are arranged to move along an axis O. The first drive unit 210 is arranged so that the first mass 212 moves away from the first actuator 214 in a first direction A along the axis O and towards the first actuator 214 in a second, opposite direction B. The second drive unit 220 is set up so that the second mass 222 moves away from the second actuator 224 in the second direction B and towards the actuator in the direction A. The net force, $F_{haptic}$, from the drive units 210, 220 may therefore be expressed as follows, where the subscript 1 relates to the first mass and actuator 212, 214, and the subscript 2 relates to the second mass and actuator 222, 224:

$$F_{haptic} = m_1 a_1 - m_2 a_2$$

If, in the example of FIG. 2, the masses 212, 222 are the same, then equal acceleration of the masses 212, 222 in opposite directions along the axis O will result in a balanced, and therefore zero, net force being exerted on the housing 230. For example, movement of the first mass 212 in the direction A may be balanced by a corresponding movement of the second mass 222 in the direction B. An unbalanced movement of the masses 212, 222 will result in a non-zero net force being exerted on the housing 230. The force will be in the direction of the imbalance. Accordingly, the arrangement of FIG. 2 will, when the masses 212, 222 move in an unbalanced way, impart net forces along the axis O, in either the direction A or the direction B.

In other examples, differences in the masses may also result in an unbalanced force being provided. For example, a first mass may have a mass that is twice the mass of the second mass. Accordingly, if these masses are arranged as in FIG. 2, an acceleration of the first mass in one direction along the axis may be balanced by an acceleration of the second mass in the opposite direction that is twice the acceleration of the first mass. Other relative accelerations will result in an imbalance and therefore a net force being exerted on the housing.

Generally, in order to generate a sustained haptic signal, the masses 212, 222 of the drive units 210, 220 may be driven according to a wave signal such that the masses oscillate. For the purpose of this example, a sine wave may be used to control each of the actuators. Other wave shapes may be used, such as sawtooth, triangle, or square. The wave shape may be non-periodic and/or include non-linearities. In some examples, the wave signal may comprise a plurality of superposed waves. The motion of a mass oscillating according to a sine wave may be described using the following equation, where x(t) is the position or displacement of the mass at time t, $A_{max}$ is the maximum excursion of the mass, f is the frequency of the oscillation, C is a phase shift of the sine wave relative to the x axis, and D is an offset of the sine wave relative to the y axis:

$$x(t) = A_{max} \text{ sin sin } (f(t + C)) + D$$

This may be rewritten as follows, where ω is angular frequency (i.e. 2πf, where f is the frequency in Hz) and ϕ is the phase shift in radians:

$$x(t) = A_{max} \text{ sin sin } (\omega t + \phi) + D$$

The acceleration of the mass may be determined as the second derivative of the displacement:

$$a = \frac{d^2x}{dt^2} = -A_{max}\sin\omega^2\sin(\omega t + \phi)$$

When this is substituted into the equation for haptic force for the masses 212, 222 of FIG. 2, the result is the following equation:

$$F_{haptic} = -m_1 A_{max1} \sin \omega_1^2 \sin(\omega_1 t + \phi_1) + m_2 A_{max2} \sin \omega_2^2 \sin(\omega_2 t + \phi_2)$$

Based on the above, where the masses 212, 222 are the same and are actuated at the same frequency, the maximum excursion and/or the phase of the movement of the masses 212, 222 may be varied to generate a haptic force. A haptic signal may comprise a haptic force over a period of time. To sustain a haptic force, the use of a wave or other time-variant input signal provides a time-variant haptic force that oscillates between a maximum haptic force and a minimum haptic force.

In the example arrangement of FIG. 2, the phase of the first and second masses 212, 222 is said to be the same when the masses 212, 222 move in opposing directions. In other words, the masses 212, 222 are in phase when one mass moves in the direction A while the other mass is moving in the direction B. The masses may then be said to be pi radians out of phase when they move in the same direction at the same time. Phase may also be considered to be relative to a central point between the two drive units 210, 220, i.e. when both masses are moving towards or away from the point they are in phase, whereas if one mass move towards the point while the other moves away, then the masses are out of phase.

In a first example, the masses 212, 222 are the same and are moved to have the same frequency and maximum excursion. When the masses move in phase, i.e. both masses have a phase of 0 radians, no net haptic force is generated in the housing. However, when the masses are moved out of phase, i.e. one mass has a phase of 0 radians and the other has a phase of pi radians, a non-zero net haptic force is generated. The phase difference may be varied to vary the magnitude of the net haptic force.

In a second example, the masses 212, 222 are the same and are moved at the same frequency and in phase. When the masses are moved with the same maximum excursion, no net haptic force is generated. However, when there is a difference in maximum excursions, a non-zero net haptic force is generated. Variation in the relative maximum excursions of the masses, and therefore the difference between the two maximum excursions, allows for variation in the magnitude of the net haptic force.

In a third example, the masses 212, 222 may be the same and may be moved at the same frequency. A combination of a phase difference and a difference in maximum excursion may be implemented, to enable further variation of the net haptic force.

Such haptic systems may be configured to independently vary the haptic signal in three degrees of freedom. Example haptic systems may be configured to vary the magnitude of the haptic signal, the duration of the haptic signal, and the frequency of the haptic signal. As will be described in relation to FIGS. 10*a* to 10*c*, in some examples, haptic systems may also be able to vary a position of the haptic signal relative to the haptic system.

A further arrangement of drive units is shown in FIG. 3. In the system 300 depicted in FIG. 3, there are three drive units 310, 320, and 330. The drive units 310, 320, 330 are coupled together by a housing 340. The three drive units 310, 320, 330 may be the same type of drive unit, such that masses and actuators included therein are the same. In FIG. 3, the three drive units 310, 320, 330 are arranged symmetrically around a central point. In arrangements, where there are four, five, six, or more drive units, these drive units may also be arranged symmetrically around a central point and coupled together. It can also be seen that in FIG. 2 the drive units are also arranged symmetrically around a central point. By arranging drive units symmetrically around a central point, such as in FIGS. 2 and 3, a net haptic force can be achieved by varying the relative movement of the drive units. More drive units may allow for more variability in the haptic signal. In some embodiments, having a higher number of drive units may allow for variation in a position of a signal and/or a direction in which it is perceived.

In some embodiments, a haptic system as described above in relation to FIG. 1, FIG. 2 or FIG. 3 may be configured to generate other output signals. The output signals may be signals for communicating information to a user of a device. In some embodiments, the haptic system may be configured to output both haptic signals and audio signals. Alternatively, as will now be described in relation to FIGS. 4 to 8, the haptic system may be configured so that the drive units are able to generate an audio signal. The drive units may be configured to generate an audio signal and a haptic signal simultaneously.

Figure 4:
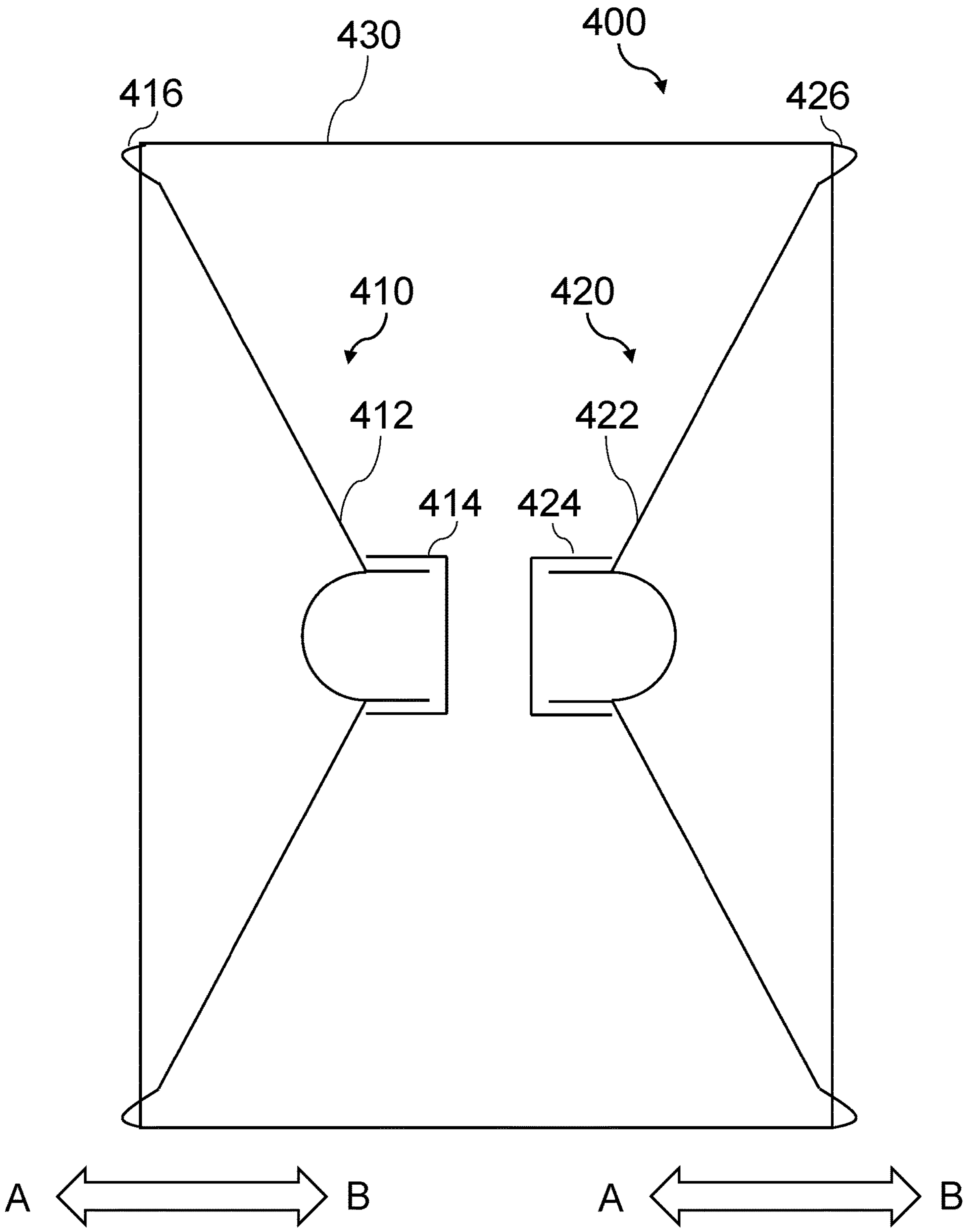
FIG. 4 is a side view of another example of a haptic system.

FIG. 4 shows a diagrammatic representation of a haptic system 400 capable of generating haptic signals and audio signals. An "audio signal" as used herein is defined as an intentional reproduction of sound. The haptic system 400 is in the form of a speaker unit. The speaker unit includes a housing 430. A first speaker 410 and a second speaker 420 are mounted to the housing 430. The first and second speaker 410, 420 are mounted to the housing 430 coaxially. The speakers 410, 420 include respective first and second diaphragms, which may also be referred to as membranes or cones, 412, 422 and first and second drive units, which may be referred to as actuators or drivers, 414, 424. The speakers 410, 420 are flexibly mounted to the housing 430 via the diaphragms 412, 422. Respective first and second suspensions 416, 426 are provided by which the first and second diaphragms 412, 422 are mounted to the housing 430. The drive units may comprise respective voice coils and magnet assemblies.

The first diaphragm 412 may therefore be considered to be or to comprise the mass 212 of FIG. 2, while the second diaphragm 414 may be considered to be or to comprise the mass 224 of FIG. 2.

The first speaker 410 is configured to radiate sound in a first direction A and the second speaker 420 is configured to radiate sound in a second direction B. Although not shown in FIG. 4, a duct may be provided to redirect sound produced by one or both of the speakers. For example, a duct may redirect sound radiated in the second direction B by the second speaker 420 so that it is radiated from the duct in the first direction A. The first and second directions, which may be referred to as acoustic radiation directions, are opposite to one another. Accordingly, the first and second speakers 410 and 420 are mounted in a back-to-back configuration.

Mounting the first and second speakers 410 and 420 in the back-to-back configuration shown in FIG. 4 provides a more compact shape, whilst also enabling interference between the output of the speakers to be harnessed to provide an audio signal and/or a haptic signal. In some embodiments, the speaker unit may have a different arrangement of speakers. For example, the diaphragms may be mounted in a back-to-back configuration with the drive units mounted in the same plane as one another to provide an even more compact arrangement. Particular examples of arrangements of speakers with which the techniques described herein may be used are described in patent applications WO 2018/056814 A1 ('LOUDSPEAKER UNIT WITH MULTIPLE DRIVE UNITS'), WO 2019/086357 A1 ('LOW PROFILE LOUDSPEAKER DEVICE'), WO 2022/029005 A1 ('SPEAKER UNIT'), and WO 2022/096560 A1 ('SPEAKER UNIT WITH A SPEAKER FRAME AND TWO OPPOSING SOUND PRODUCING MEMBRANES'), each of which are incorporated by reference. Other forms of speaker unit in which the diaphragms are arranged in a back-to-back configuration may also be used with the techniques described herein. The techniques described herein may also be applied using diaphragms or speakers that are arranged face-to-face.

Furthermore, although FIG. 4 shows a speaker unit comprising two speakers, in other embodiments speaker units may comprise more than two speakers. In these embodiments, the speakers may be arranged to produce the effects described in relation to FIGS. 5 to 7. For example, in embodiments where the speakers are the same, they may be arranged symmetrically within the housing. In some embodiments, the speakers may be in the same plane. In an example where a speaker unit comprises three identical speakers, the speakers may be arranged about a central point so that they radiate sound in the same plane in directions that are 120 degrees apart, and so that they are equidistant from the central point.

FIGS. 5 to 7 demonstrate how the speakers may be controlled to provide an audio and/or a haptic signal using balanced and imbalanced/unbalanced movements of the speakers.

FIGS. 5 to 7 each show two charts, with an upper chart, labelled as chart 'a', showing the haptic signal generated by the speaker, and the lower chart, labelled as chart 'b' showing the audio generated by the speaker in the example described. In each of the examples of FIGS. 5 to 7, for ease of explanation the signal according to which the speakers are controlled is a 20 Hz sine wave. Generally, speakers such as those of FIG. 4 may be controlled using signals having other frequencies and other wave profiles. Such speakers are also capable of converting those signals to movement of the diaphragms using their respective actuators. Additionally, for ease of explanation, FIGS. 5 to 7 are described based on the arrangement of speakers shown in FIG. 4, although in other examples, other arrangements of speakers as described herein may be used to achieve the same effects. It is assumed, for the purpose of FIGS. 5 to 7, that the diaphragms of the speakers of FIG. 4 have the same mass. In these examples, the diaphragms have a mass of 50 g, other examples may have other masses.

Figure 5A:
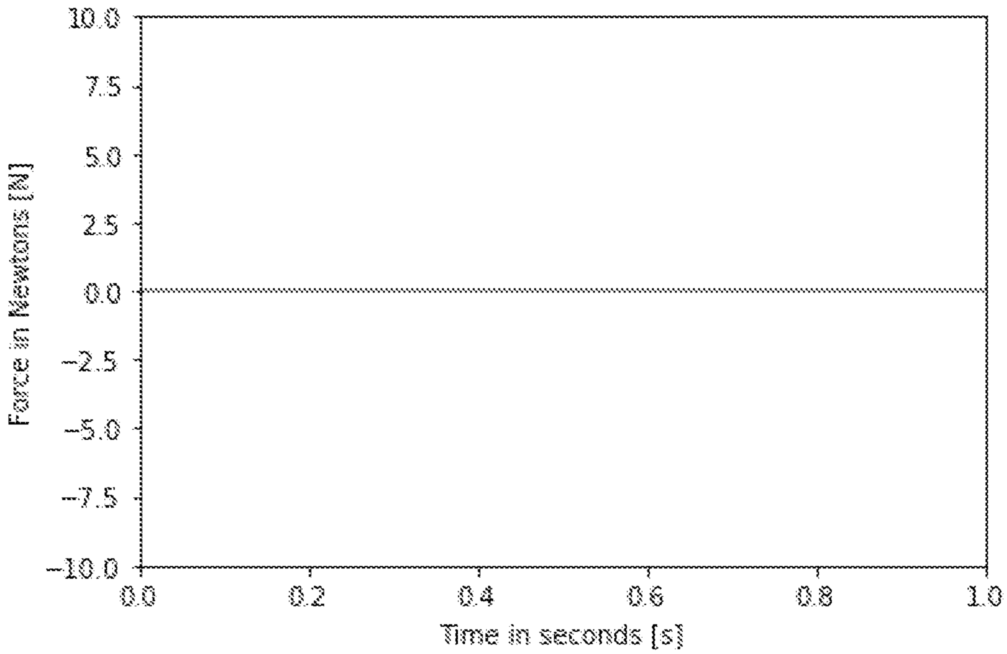
FIGS. 5*a* and 5*b* are charts illustrating a first example operation of the haptic system of FIG. 4.
Figure 5B:
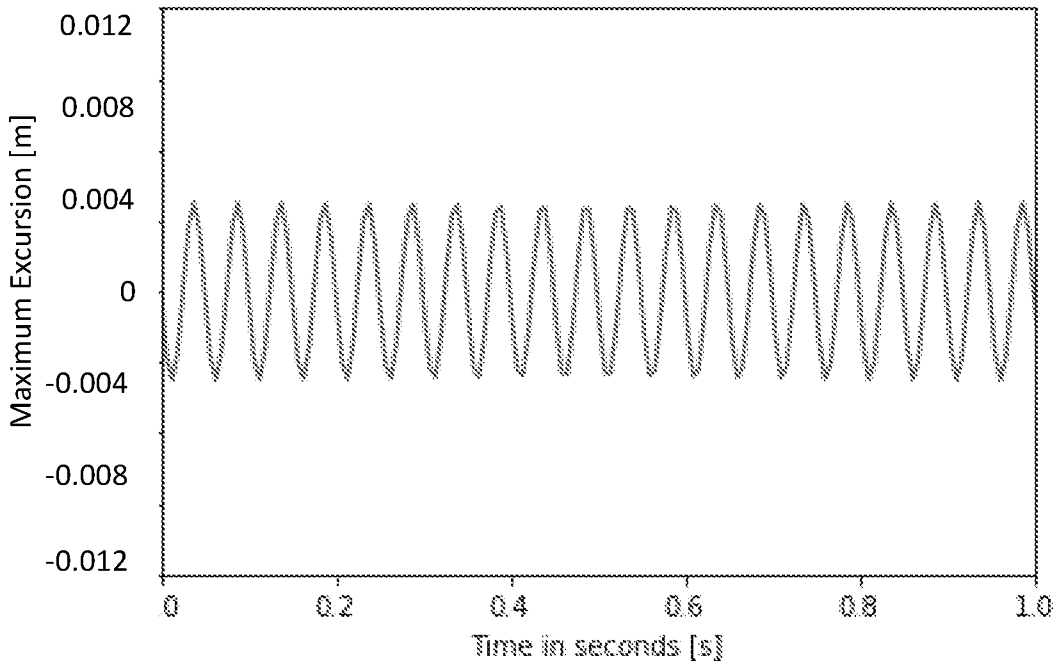

FIGS. 5*a* and 5*b* illustrate a first example, in which a speaker unit, such as the speaker unit 400 of FIG. 4, may be used to generate sound without generating a haptic signal. In the example of FIGS. 5*a* and 5*b*, sound is being generated by driving the coaxial speakers. The diaphragms are driven to have the same excursion, and so that their respective diaphragms have the same phase. In other words, the same control signal is used to control both the speakers, so that the excursions and phase of the speakers is the same. Both diaphragms move in their direction of acoustic radiation at the same time. When a sine wave is used to drive the speakers, the diaphragms effectively pulse outwardly, away from one another, and inwardly, towards one another together.

By driving the diaphragms in this way, the forces created by the speakers are balanced. As described in the first example relating to FIG. 2 above, such balancing of oscillating masses results in no net force being exerted on the housing of the speakers. Accordingly, as shown in FIG. 5*a*, the force exerted on the housing remains at substantially 0 N.

However, because the diaphragms are travelling in opposite directions due to the input signals provided to them, there is reinforcement of the sound waves created by the speakers, and a sound is generated. The resultant sound shown in FIG. 5*b* is a 20 Hz tone.

Figure 6A:
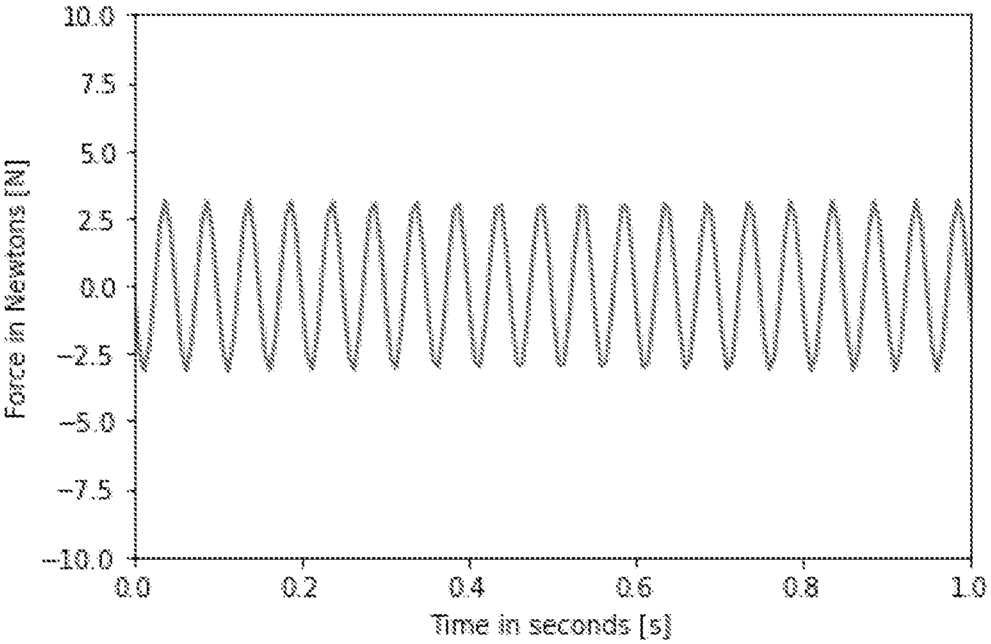
FIGS. 6*a* and 6*b* are charts illustrating a second example operation of the haptic system of FIG. 4.
Figure 6B:
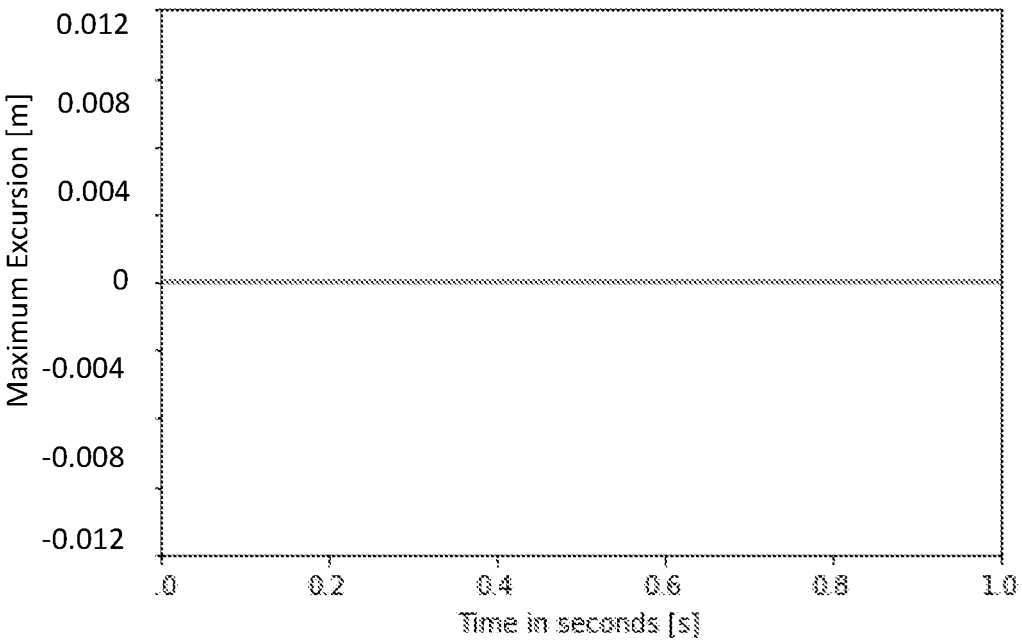

FIGS. 6*a* and 6*b* illustrate a second example, in which the speaker unit is used to generate a haptic signal without generating sound. In this example, haptic force is being generated by driving the coaxial speakers so that their excursions are the same, but the respective diaphragms are pi radians out of phase. In other words, the diaphragms both move in the same direction at the same time.

By oscillating the speakers in this way, the net force exerted by the speakers on the housing is not cancelled out but instead reinforces. Accordingly, as can be seen in FIG. 6*a*, an oscillating net force is experienced at the housing. In FIG. 6*a* the net force oscillates at 20 Hz because the speakers are driven at 20 Hz. However, because the speakers are moving in the same direction together, the arrangement enables cancellation of the sound waves generated by each speaker. Although each speaker may be oscillating in a way that would ordinarily generate, e.g., a 20 Hz tone, the back-to-back arrangement enables interference between the waves to ensure that substantially no sound is emitted, as shown in FIG. 6*b*. The skilled person will be aware that many suitable arrangements can provide the required interference between the waves so that no sound is emitted, these include the arrangements of WO 2018/056814 A1 ('LOUDSPEAKER UNIT WITH MULTIPLE DRIVE UNITS'), WO 2019/086357 A1 ('LOW PROFILE LOUDSPEAKER DEVICE'), WO 2022/029005 A1 ('SPEAKER UNIT'), and WO 2022/096560 A1 ('SPEAKER UNIT WITH A SPEAKER FRAME AND TWO OPPOSING SOUND PRODUCING MEMBRANES', incorporated herein by reference. It can be tested whether substantially no sound is emitted by driving the diaphragms with a sine wave of the same amplitude and frequency but pi radians out phase and measuring the resulting sound, such as via a microphone.

FIGS. 5*a* and 5*b* and FIGS. 6*a* and 6*b* represent cases in which the speakers operate with the same excursions and generate either an audio signal or a haptic signal. In some embodiments, both an audio signal and a haptic signal may be generated. In some examples, this may be achieved by varying the relative phase of the speakers. In other examples, such as the example described in relation to FIGS. 7*a* and 7*b* below, an audio signal and a haptic signal may be produced by operating the speakers in or out of phase but by varying the relative excursions of the diaphragms. In other examples, the relative phase and excursions may be varied to achieve further variation of the audio and haptic signals.

Figure 7A:
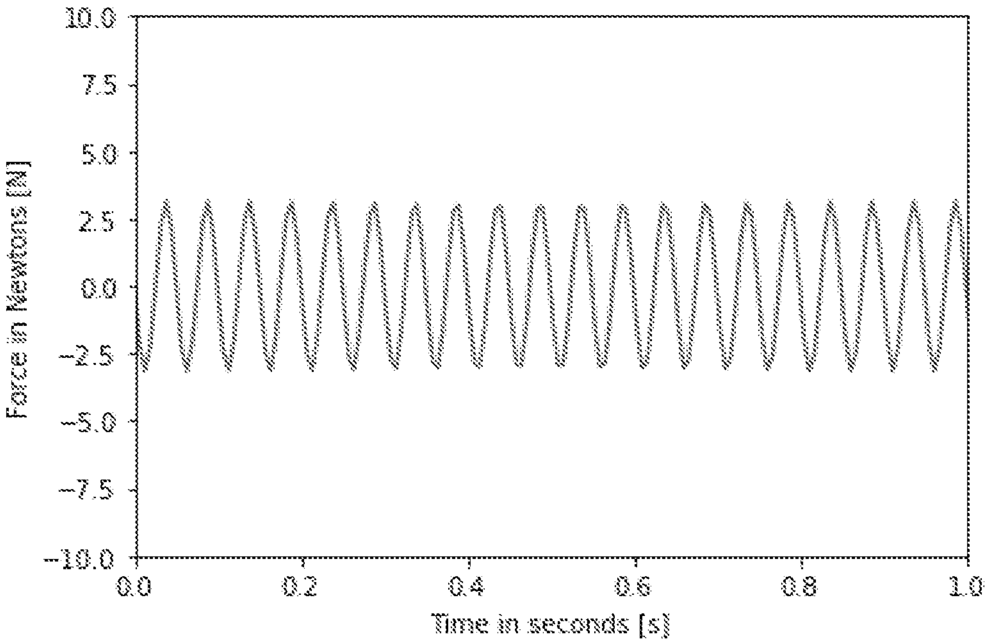
FIGS. 7*a* and 7*b* are charts illustrating a third example operation of the haptic system of FIG. 4.
Figure 7B:
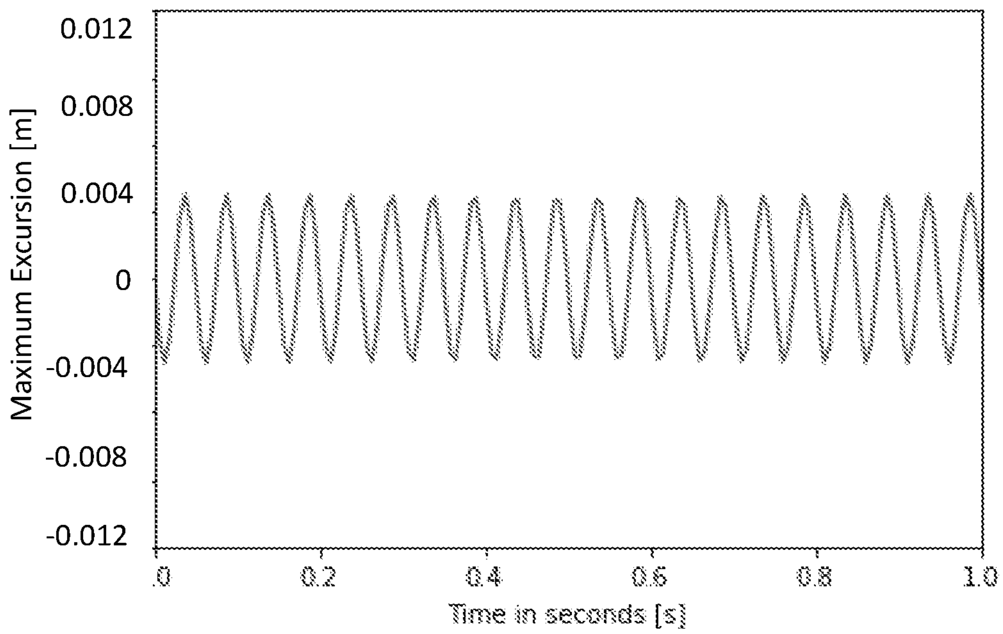

In FIGS. 7*a* and 7*b*, the diaphragms are driven at the same phase. If the diaphragms were driven to have the same excursion, then no haptic force would be generated but sound would be generated as shown in FIGS. 5*a* and 5*b*. However, in this example, the relative excursions of the diaphragms are varied. The diaphragm of one speaker is driven to have a first excursion while the diaphragm of the other speaker is driven with a second excursion, which is different to the first. Accordingly, as indicated above, this generates a non-zero net force because of the imbalance in excursions. A haptic signal and an audio signal are generated, as can be seen in FIGS. 7*a* and 7*b* respectively. Thus, a haptic signal and an audio signal can be generated simultaneously by a pair of back-to-back speakers. The haptic signal may be generated while the audio signal is being played without interrupting the audio signal.

In examples where a haptic signal and an audio signal are being generated simultaneously, there is an increased probability that the excursion of a speaker will exceed a maximum allowable excursion. When a speaker exceeds a maximum excursion for its diaphragm, distortion may occur. In order to avoid unwanted distortion from affecting sound quality, a controller of the speaker unit may be configured to determine excursion of each of the speakers, which may be referred to as drive units in other examples, and to compare the excursion with a threshold value. The excursion may be determined with reference to a look-up table. The look-up table may relate the excursion with an amplitude of an input signal for the speaker unit, for example. The excursion may additionally or alternatively be determined using one or more sensors. If the controller determines that the excursion of one or both of the speakers exceeds the threshold, then it may control the speaker in which the exceedance occurred to reduce a magnitude of the haptic signal. The magnitude of the haptic signal may be reduced so that the excursion does not exceed the threshold. If the controller determines that the excursion of one or both of the speakers exceeds the threshold, then it may control the speaker in which the exceedance occurred to reduce an amplitude of the audio signal.

The controller may be configured to prioritize the audio signal where control of the speaker unit to produce both audio and haptic signals causes unallowable excursions of the diaphragms. In some examples, the controller may reduce the audio signal as well as the haptic signal. In some examples, the controller may universally reduce the amplitude of an audio signal and/or haptic signal or the controller may be configured to selectively reduce particular frequencies. For example, the excursion may be determined to be caused by a particular set of frequencies, and the controller may reduce these frequencies in a signal provided to the speakers.

In some examples, the excursion may be determined based on a magnitude of one or more control signals used to control one or both of the speakers. In these examples, the excursion may be determined before the control signal is used to control the speaker. Alternatively, the exceedance may be determined based on a measurement of the operation of the speaker in response to a control signal.

Figure 8A:
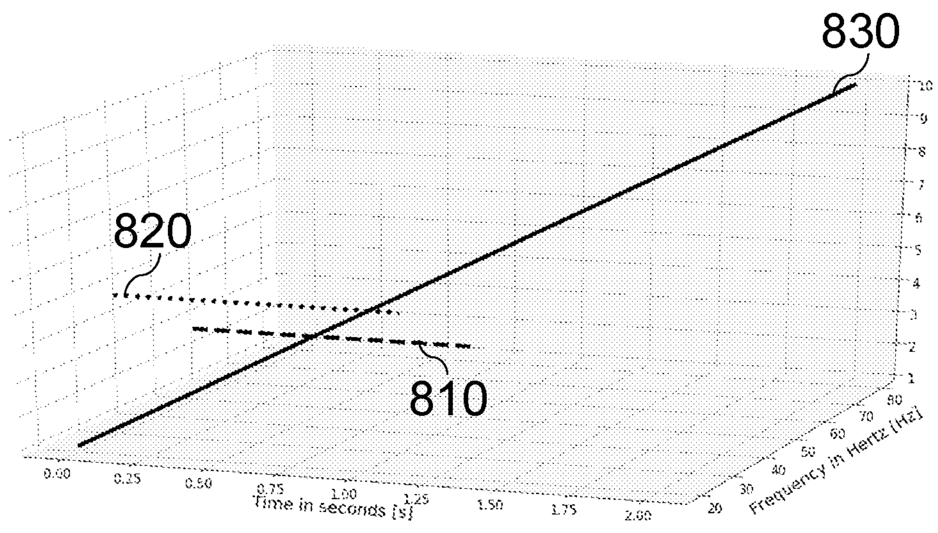
FIGS. 8*a* to 8*c* are visualizations of control parameters for a haptic system.
Figure 8B:
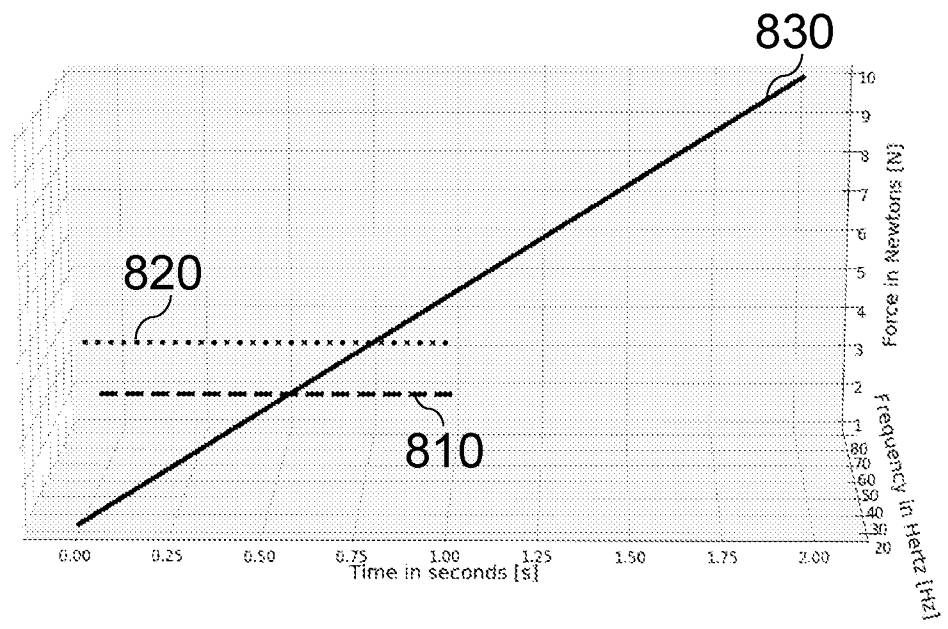
Figure 8C:
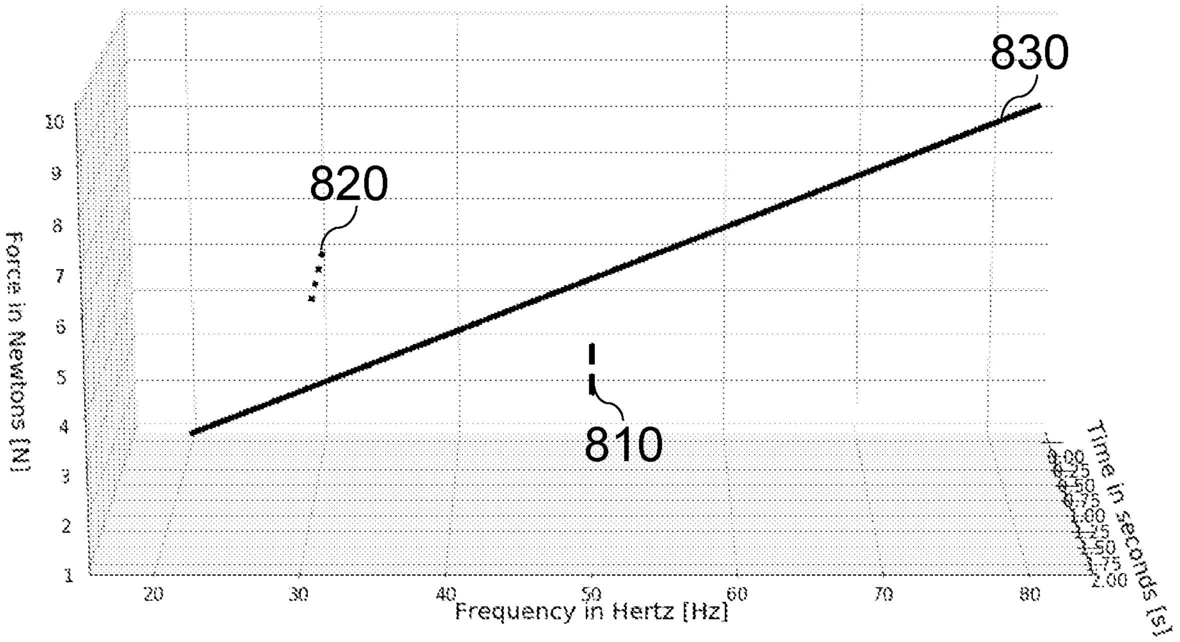

FIGS. 8*a* to 8*c* are different views of a three-dimensional graph showing examples of different haptic signals and how each example signal may vary in duration, frequency, and/or magnitude. Three different haptic signals are shown in FIGS. 8*a* to 8*c*: a first haptic signal 810, a second haptic signal 820, and a third haptic signal 830. Each of the haptic signals may be generated by a haptic system as described above.

The first haptic signal 810 has a first duration, a first frequency, and a first magnitude. In this example, the first duration is 1 second, the first frequency is 50 Hz, and the first magnitude is approximately 2 N. The second haptic signal 820 has a second duration, a second frequency, and a second magnitude. In this example, the second duration is the same as the first duration at 1 second, the second frequency is 30 Hz, and the second magnitude is approximately 5 N. In both the first and second haptic signals 810, 820, the frequency and magnitudes are constant and do not change. The third haptic signal 830 has a third duration, a third frequency, and a third magnitude. The third duration is 2 seconds. The third frequency and the third magnitude vary over time. The third frequency varies from 20 Hz at 0 seconds to 80 Hz at 2 seconds. The third magnitude varies from 2 N at 0 seconds to 10 N at 2 seconds. Accordingly, the third haptic signal 830 begins as a low frequency, low magnitude vibration and increases linearly in both frequency and magnitude to a higher frequency with a higher magnitude.

Figure 9:
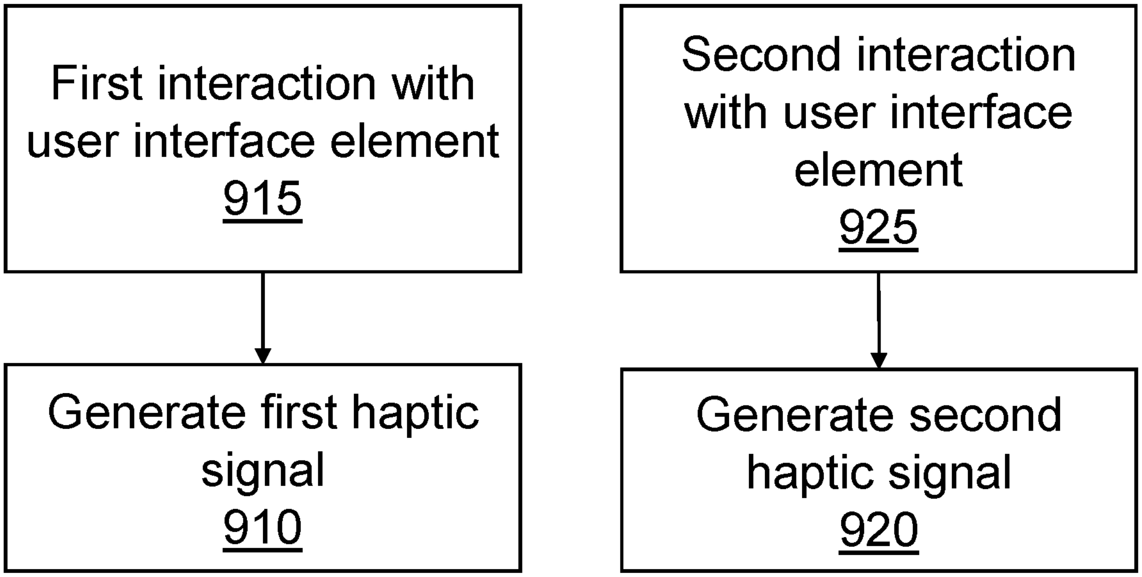
FIG. 9 is a flow chart illustrating a method of operation of a haptic system.

In FIGS. 8*a* to 8*c*, the first and second haptic signals 810, 820 have the same duration but different frequencies and magnitudes. Generally, as illustrated in FIG. 9, a haptic system may be operated to provide haptic feedback, by performing a method 900 comprising, at block 910, generating a first haptic signal, such as 810, after a first interaction with a user interface element, such as is shown in block 915, and, at block 920, generating a second haptic signal, such as 820, after a second interaction with the same user interface element, which is shown in block 925. The first and second haptic signals may be different and may be associated with functions of the user interface element or a parameter adjusted by the user interface element.

The first, second, and third haptic signals 810, 820, 830 are example haptic signals. In other examples, the haptic signals may have any duration, frequency, or magnitude that may be achieved using the haptic system on which they are to be implemented. Furthermore, the haptic signals may vary in frequency and/or magnitude over the duration in any way. For example, the frequency and/or magnitude may be constant for a portion of the duration before changing to a different frequency and/or magnitude for another portion of the duration. The change may be substantially a step change, a linear change, or a non-linear change. This enables a design space to be provided represented by, e.g., the box shown in FIGS. 8*a* to 8*c*. The haptic system described herein may enable a haptic signal to be generated at any position within that design space, rather than being limited by resonances and/or a dependence between frequency and magnitude as in other haptic systems.

The duration, frequency, and/or magnitude may be varied dependent upon one or more input parameters. As indicated above, a haptic signal may be associated with a user interface element, a function of a user interface element, or a parameter controlled by a user interface element. For example, the haptic signal may be associated with a particular button, such that the haptic signal is provided in response to pressing the button. In some examples, the button may have two functions. An example is a play/pause button for use with audio. When the button is pressed to commence playing the audio, a first haptic signal may be provided. When the button is pressed to pause playing the audio, a second haptic signal may be provided that is different from the first.

The haptic signal may be associated with a different form of user interface element, such as a switch. Where the haptic signal is associated with a switch, a first haptic signal may be associated with a parameter controlled by the switch indicating true and a second haptic signal may be associated with the parameter controlled by the switch being false. When the switch indicates 'true', this may mean that a function is on or active, while 'false' may refer to a function being off or not active. The switch may be a radio switch.

The haptic signal may be associated with a slider or other moving element of a user interface. For example, a volume slider or a slider associated with equalization such as bass, treble, or other frequency adjustments for audio may be associated with a haptic signal. In some examples, the element may comprise a wheel element that rotates or mimics rotation through dates, times, or other options on a device. The haptic signal may vary, as the third haptic signal 830 of FIGS. 8*a* to 8*c* does, as the slider is moved. In this example, the duration may be variable and may be related to the duration for which the slider is moved. The frequency and/or magnitude of the haptic signal may be proportional to the volume of audio, for example. In some examples, a haptic signal may be associated with a particular user interface element or function of a device, but may be dependent upon other parameters. For example, a haptic signal for a playback button may have a different magnitude that depends on the volume of audio being played or that will be played. For example, where a speaker system incorporates the haptic system, either in the form of the speaker unit as described above in relation to FIG. 4 or separately from a speaker unit, the frequency, magnitude, and/or duration of a haptic signal may be dependent upon volume. For example, when pressing a play/pause button, the haptic signal may have a higher magnitude if the volume of the audio is or will be high than when the volume is or will be lower. A magnitude and/or frequency may increase or decrease depending on a direction in which the parameter is changed. In some examples, one of frequency and magnitude may indicate a current level for a value of a parameter, while the other of frequency and magnitude indicates the direction of change.

References to buttons, sliders, or other user interface elements herein may refer to elements displayed on a display of a user interface or to physical elements. Elements displayed on a display may be interacted with by a user via a touch screen, and the haptic signal may be generated to be perceived by the user via the touch screen. A haptic system may be coupled to a touch screen and configured to generate haptic signals in response to a user interacting with user interface elements via the touch screen. In other examples, a user may interact with elements on a display using another input device. The haptic signal may be generated in the input device used by a user or in another element. Where the element is a physical element, it may comprise a touch, i.e. capacitive, button. Physical capacitive or touch buttons are buttons that are provided on a housing and use touch input as interactions with users to implement specific functions. However, these buttons may not be displayed on touch screens and are instead permanent or always visible on a housing of a device. In other embodiments, the physical element may comprise a mechanical button. Haptic signals may be used with physical, capacitive or mechanical buttons. When used with capacitive buttons, haptic signals as described herein allow for simulation of mechanical buttons, and also permit different mechanical buttons to be simulated for different functions associated with the same capacitive button. For mechanical buttons, while some feedback is already provided by the button having mechanical components, combining this feedback with a haptic signal enables a greater variety in the information that can be communicated to a user. For example, a haptic signal may be used to confirm to a user that an interaction with a mechanical button has been received and that the function associated therewith has been activated or deactivated. This may allow a user to know that what their intended function when pressing the button has been implemented more quickly than would otherwise be possible. In an example where a mechanical button controls playing of audio, a haptic signal confirms to the user quickly that the command has been received, whereas it may not be immediately apparent from the audio that the command has been received (because there is a period of silence or low volume at the beginning of a track, for example).

Although FIGS. 8*a* to 8*c* are used to describe and show different variations in haptic signals, such a visualization using a 3D graph of the haptic signals may be used in the design of and implementation of haptic signals. A 3D graph having duration on a first axis, frequency on a second axis, and magnitude on a third axis may be displayed via a user interface. The 3D graph may be referred to as a 'design space' Input may be provided to the design space via the user interface or otherwise indicating values for each of the duration, frequency, and magnitude for a particular haptic signal. Input may also be provided relating to a user interface element, a function associated with a user interface element, or a parameter adjusted by a user interface element that is to be associated with the haptic signal. The user interface element may be a user interface element of a device being used by the user or a user interface element of a different device. A processor may be configured to receive the input and visualize, as a line in the 3D graph, the haptic signal. The processor may provide a label indicating the user interface element, function, or parameter with which the haptic signal is associated. The processor may be configured to provide data to a device including a haptic system. The device may be configured to generate the haptic signal using the haptic system when a user interacts with the user interface element. The use of a design space allows for straightforward and efficient visualization and design of haptic signals. The design space may implement threshold durations, frequencies, and/or magnitudes that cannot be exceeded by haptic signals. These thresholds may be visualized within the design space. The thresholds may be determined based on properties of the haptic system on which the haptic signal is to be implemented. For example, the thresholds may represent a level above which the haptic system is unable to replicate the haptic signal. This may be due to available power, frequencies at which cancellation or variation in the signal is not available, or other reasons, such as risk of damage to the device or haptic system. The thresholds may alternatively represent levels above which unwanted effects, such as distortion of audio or unwanted noise from the vibrations, will occur.

Figure 10A:
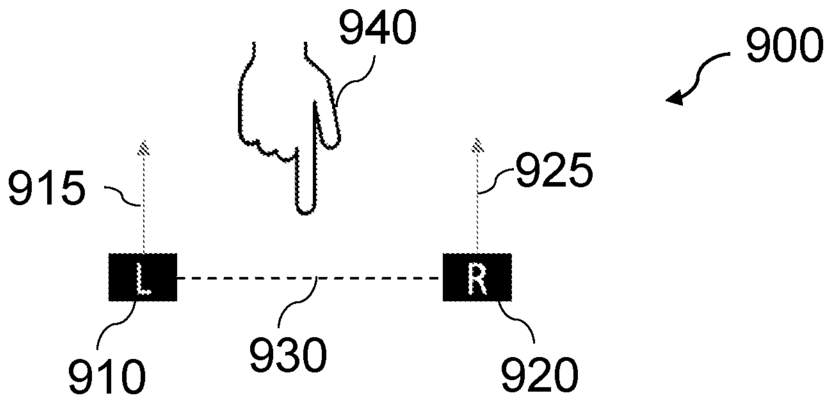
FIGS. 10*a* to 10*c* are schematic diagrams of an arrangement of two haptic systems.
Figure 10B:
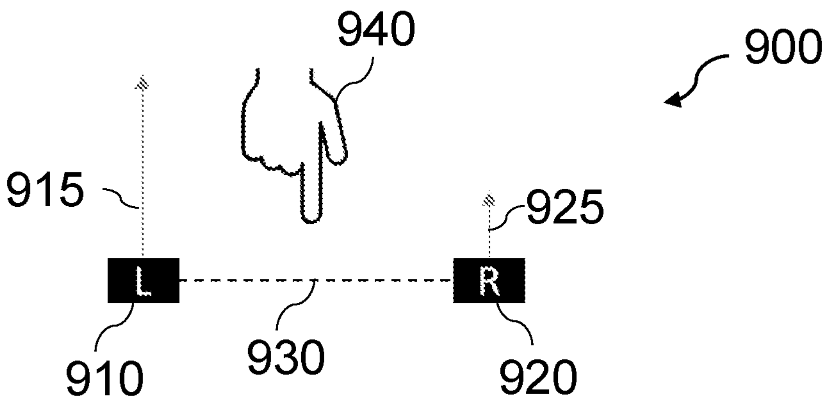
Figure 10C:
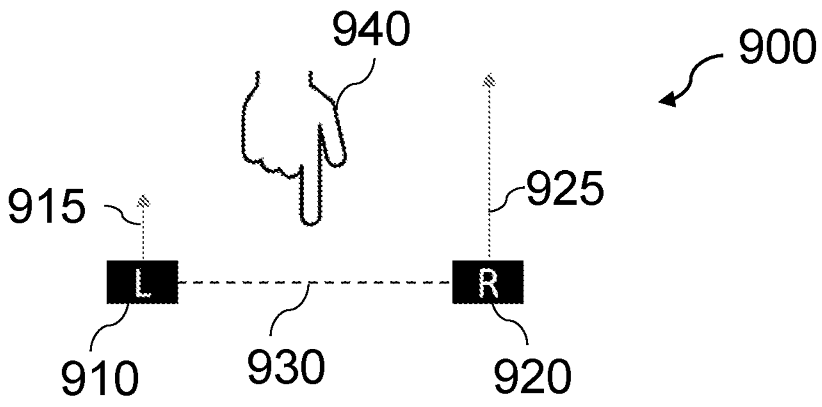

The description above illustrates how a haptic signal may be varied with respect to duration, amplitude, and/or frequency of the signal, as well as how an audio signal may be provided at the same time as a haptic signal. FIGS. 10*a* to 10*c* illustrate a particular arrangement of a haptic system for varying a position of a haptic signal relative to the system as well as duration, magnitude, and/or frequency.

In FIG. 10*a*, a haptic system 1000 is shown. The haptic system includes a first set of drive units 1010. The first set of drive units 1010 comprises two or more drive units, such as those described in relation to FIGS. 1 to 3, or two or more speaker units, such as those described in relation to FIG. 4. The haptic system also includes a second set of drive units 1020. The second set of drive units 1020 also comprises two or more drive units or two or more speaker units that are different from and spatially separated from the drive units of the first set of drive units 1010. The first and second sets of drive units 1010, 1020 are coupled to a shared housing (not shown). The first and second sets of drive units 1010, 1020 are spaced apart from one another, thereby creating a distance 1030 therebetween the sets of drive units. A haptic signal may be produced by each of the first and second sets of drive units 1010, 1020. In FIGS. 10*a* to 10*c* this is depicted using arrows 1015 and 1025 for the haptic signals produced by the first and second sets of drive units 1010, 1020 respectively.

The first and second sets of drive units 1010, 1020 may be controlled by a controller (not shown) to vary a position of the haptic signal relative to the sets of drive units. The position may be varied along the distance 1030 between the sets of drive units. The controller may be shared between and configured to control each of the drive units in the first and second sets of drive units 1010, 1020.

In order to vary the position, a relative magnitude of the haptic signals may be varied. In FIG. 10*a*, the magnitudes 1015, 1025 are approximately equal, so that a user 1040 touching the housing to which the sets of drive units 1010, 1020 are coupled would perceive a position of the haptic signal as being centrally located between the sets of drive units 1010, 1020.

In FIG. 10*b*, the first set of drive units 1010 is controlled by the controller to generate a haptic signal having a larger magnitude 1015, whereas the second set of drive units 1020 is controlled by the controller to generate a haptic signal having a smaller magnitude 1025. Accordingly, a stronger force is experienced more towards the first set of drive units 1010, meaning that a position of the force is varied towards this set of drive units. The position of force may therefore be perceived to be closer to the left-hand side of a housing.

In FIG. 10*c*, the second set of drive units 1020 is controlled to generate a haptic signal having a magnitude 1025 that is larger than in FIG. 10*a*, and the first set of drive units 1010 is controlled to have a magnitude 1015 that is smaller than in FIG. 10*a*, meaning the position of the haptic signal is now varied towards the second set of drive units 1020.

Variation in position of haptic signals may be useful in providing information to a user. For example, where a user interface element has a location on a device, a position of the haptic signal may be varied based on the location of the user interface element. In particular, the position of the haptic signal may be matched to the location of the user interface element so that a user interacting with the user interface element feels a localized haptic signal. This may be useful in allowing differentiation between different user interface elements, particularly where several user interface elements are provided close together or there are a large number of elements. In other examples, a position of a haptic signal may be varied based on a position of interaction with a user interface element. For example, a user may be able to interact with a particular user interface element over a portion of a housing. Particularly, an element may be long and thin, meaning that there are multiple different places at which it can be interacted with. A particular example is a volume slider. The position of the haptic signal associated with that element may be varied based on the location of interaction or a parameter associated with the element. In the example of a volume slider, the position may be varied dependent on where the volume slider is currently, where the volume slider is interacted with by the user (if part of a touchscreen, for example), or based on a volume being controlled by the user.

Accordingly, two haptic signals may have the same position or a different position. Where two different haptic signals are associated with the same element, then they may have the same position. Where two different haptic signals are associated with different elements, they may have different positions corresponding to the different positions of those elements. Where two different haptic signals are associated with the same element but the element moves or can be interacted with at different locations on the housing or controls a value of a parameter over a range of values, the position may vary depending on the element's location, the location of interaction, or the value of the parameter.

In some embodiments, in addition to frequency, magnitude, duration, and/or position, a haptic system may be configured to provide other forms of feedback. In particular examples, such as in FIG. 4 above, a haptic system may be configured to provide audio signals. In these examples, haptic signals may be varied in frequency, magnitude, and duration (and position, if configured as in FIGS. 10*a* to 10*c*), and audio signals may also be varied in frequency, magnitude, and duration (and position if configured as in FIGS. 10*a* to 10*c*). This thereby provides at least six different variables that can be used to present information. In some examples, a particular audio signal may accompany a haptic signal for a particular interaction with a user interface element. The audio signal may differ from the haptic signal by its frequency. A different audio signal may be generated to accompany a different haptic signal for a different interaction with the same user interface element. By providing audio and haptic signals, two different forms of feedback may be provided.

III. Conclusion

The haptic systems and methods for operating haptic systems described above enable a greater scope for providing feedback. In particular, the techniques described herein allow for greater variability in haptic signals. This variability may be achieved by allowing for independent variation of at least three parameters, duration, frequency, and magnitude, of a haptic signal. Other embodiments allow for further parameters to be provided, providing further variability. For example, a position of the haptic signal may be varied. In other examples, sound may be generated by the haptic system, meaning a further three parameters may be varied with regard to sound. The ability to vary signals in this way allows for a greater range of information that can be communicated from a device using haptics and/or audio.

Some arrangements of the haptic system described above allow for a compact haptic system. Some arrangements enable an audio signal to be generated at the same time as generating a haptic signal. In some arrangements, the same actuators intentionally produce an audio signal and a haptic signal. Accordingly, because the haptic system described herein may reproduce both audio and haptics, an even more compact arrangement is achieved. In playback devices, mobile devices, or other devices that have previously included separate systems for audio and haptic signal generation, these may now be combined, providing useful space-saving in those devices.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

Further examples are set out in the following clauses.

Clause 1: A haptic system, comprising: a housing; at least two drive units coupled to the housing, each drive unit comprising a mass movable relative to the housing; and a controller configured to generate a haptic signal by causing at least one of the at least two drive units to exert a net force on the housing.

Clause 2: the haptic system of clause 1, wherein the at least two drive units comprise speaker diaphragms and the controller is configured to control the at least two drive units to generate audio.

Clause 3: the haptic system of clause 2, wherein the controller is configured to control the at least two drive units to generate audio and the haptic signal simultaneously.

Clause 4: the haptic system of clause 3, wherein the controller is configured to determine that an excursion of the at least two drive units exceeds a threshold and responsively reduce at least one of a magnitude of the haptic signal and an amplitude of the audio.

Clause 5: the haptic system of any of clauses 2 to 4, wherein the controller is configured to generate the haptic signal substantially without sound by driving the drive units such that sound waves generated by a first speaker diaphragm are cancelled by sound waves generated by a second speaker diaphragm.

Clause 6: the haptic system of any of clauses 2 to 5, wherein the at least two speaker diaphragms are coaxial.

Clause 7: the haptic system of clause 6 wherein the coaxial diaphragms are positioned back-to-back.

Clause 8: the haptic system of any of clauses 1 to 7, wherein: the at least two drive units form a first set of drive units; the haptic system comprises a second set of drive units including at least two further drive units, each drive unit comprising a mass movable relative to the housing; the first and second sets of drive units are spaced from one another; and the controller is configured to control the at least two sets of drive units to provide a haptic signal at a position between the first set of drive units and the second set of drive units.

Clause 9: a method for providing a haptic signal using a haptic system, wherein the haptic system comprises a housing and at least two drive units coupled to the housing, each drive unit comprising a mass movable relative to the housing, wherein the method comprises: generating a haptic signal by causing at least one of the at least two drive units to exert a net force on the housing of the haptic system.

Clause 10: the method of clause 9, wherein the at least two drive units comprise speaker diaphragms and the method further comprises controlling the at least two drive units to generate audio, optionally without generating a haptic signal.

Clause 11: the method of clause 10, comprising controlling the at least two drive units to generate audio and the haptic signal simultaneously.

Clause 12: the method of clause 11, comprising: determining that an excursion of the at least two drive units exceeds a threshold; and responsively reducing at least one of a magnitude of the haptic signal and an amplitude of the audio.

Clause 13: the method of any of clauses 9 to 12, wherein the drive units are positioned to generate the haptic signal substantially without sound by cancellation of sound waves generated by the speaker diaphragms.

Clause 14: the method of any of clauses 9 to 13, wherein the at least two drive units form a first set of drive units, the haptic system comprises a second set of drive units including at least two further drive units, each drive unit comprising a mass movable relative to the housing, the first and second sets of drive units are spaced from one another, and wherein the method comprises: controlling the at least two sets of drive units to provide a haptic signal at a position between the first set of drive units and the second set of drive units.

Clause 15: a computer-readable medium comprising instructions, which, when executed by a processor, cause the processor to carry out a method for providing a haptic signal using a haptic system, wherein the haptic system comprises a housing and at least two drive units coupled to the housing, each drive unit comprising a mass movable relative to the housing, wherein the method comprises: controlling the at least two drive units to generate a haptic signal by causing a net force to be exerted on the housing of the haptic system by the at least two drive units.

Clause 16: the computer-readable medium of clause 15, wherein the at least two drive units comprise speaker diaphragms and the method further comprises controlling the at least two drive units to generate audio.

Clause 17: the computer-readable medium of clause 16, comprising controlling the at least two drive units to generate audio and the haptic signal simultaneously.

Clause 18: the computer-readable medium of clause 17, comprising: determining that an excursion of the at least two drive units exceeds a threshold; and responsively reducing a magnitude of the haptic signal.

Clause 19: the computer-readable medium of any of clauses 15 to 18, wherein the drive units are positioned to generate the haptic signal substantially without sound by cancellation of sound waves generated by the speaker diaphragms.

Clause 20: the computer-readable medium of any of clauses 15 to 19, wherein the at least two drive units form a first set of drive units, the haptic system comprises a second set of drive units including at least two further drive units, each drive unit comprising a mass movable relative to the housing, the first and second sets of drive units are spaced from one another, and wherein the method comprises: controlling the at least two sets of drive units to provide a haptic signal at a position between the first set of drive units and the second set of drive units.

The invention claimed is:

1. A haptic system, comprising:

a housing;

at least a first drive unit and a second drive unit, the first drive unit coupled to the housing and comprising a first mass movable relative to the housing, the second drive unit coupled to the housing and comprising a second mass movable relative to the housing; and a controller configured to generate a haptic signal by causing at least one of the first drive unit or the second drive unit to exert a net force on the housing wherein:

the first drive unit and the second drive unit form a first set of drive units;

the haptic system comprises a second set of drive units including at least a third drive unit and fourth drive unit, the third drive unit comprising a third mass movable relative to the housing and the fourth drive unit comprising a fourth mass movable relative to the housing;

the first and second sets of drive units are spaced from one another; and the controller is configured to control the first set of drive units and the second set of drive units to provide a haptic signal at a position between the first set of drive units and the second set of drive units.

2. The haptic system of claim 1, wherein the first drive unit comprises a first speaker diaphragm, the second drive unit comprises a second speaker diaphragm, and the controller is configured to control the first drive unit and the second drive unit to generate audio.

3. The haptic system of claim 2, wherein the controller is configured to control the first drive unit and the second drive unit to generate audio and the haptic signal simultaneously.

4. The haptic system of claim 3, wherein the controller is configured to determine that an excursion of the first drive unit and the second drive unit exceeds a threshold and responsively reduce at least one of a magnitude of the haptic signal and an amplitude of the audio.

5. The haptic system of claim 2, wherein the controller is configured to generate the haptic signal substantially without sound by driving the first drive unit and the second drive unit such that sound waves generated by the first speaker diaphragm are cancelled by sound waves generated by the second speaker diaphragm.

6. The haptic system of claim 2, wherein the first speaker diaphragm and the second speaker diaphragm are coaxial.

7. The haptic system of claim 6, wherein the first speaker diaphragm and the second speaker diaphragm are positioned back-to-back.

8. The haptic system of claim 1, wherein the controller is configured to control the first set of drive units and the second set of drive units to provide at least two simultaneous haptic signals at different positions.

9. A method for providing a haptic signal using a haptic system, wherein the haptic system comprises a housing and at least a first drive unit and a second drive unit, the first drive unit coupled to the housing and comprising a first mass movable relative to the housing, the second drive unit coupled to the housing and comprising a second mass movable relative to the housing, the first drive unit and the second drive unit form a first set of drive units, the haptic system comprises at least a second set of drive units including at least a third drive unit and a fourth drive unit, the third drive unit comprising a third mass movable relative to the housing, the fourth drive unit comprising a fourth mass movable relative to the housing, and the first and second sets of drive units are spaced from one another, wherein the method comprises:

generating a haptic signal by causing at least one of the first drive unit and the second drive unit to exert a net force on the housing of the haptic system; and controlling at least the first set of drive units and the second set of drive units to provide a haptic signal at a position between the first set of drive units and the second set of drive units.

10. The method of claim 9, wherein the first drive unit comprises a first speaker diaphragm and the second drive unit comprises a second speaker diaphragm, and the method further comprises controlling the first drive unit and the second drive unit to generate audio, optionally without generating a haptic signal.

11. The method of claim 10, comprising controlling the first drive unit and the second drive unit to generate audio and the haptic signal simultaneously.

12. The method of claim 11, comprising:

determining that an excursion of the first drive unit and the second drive unit exceeds a threshold; and responsively reducing at least one of a magnitude of the haptic signal and an amplitude of the audio.

13. The method of claim 9, wherein the first drive unit and the second drive unit are positioned to generate the haptic signal substantially without sound by cancellation of sound waves generated by the first speaker diaphragm and the second speaker diaphragm.

14. The method of claim 9, further comprising controlling at least the first set of drive units and the second set of drive units to provide at least two simultaneous haptic signals at different positions.

15. One or more tangible, non-transitory computer-readable media comprising instructions, which, when executed by one or more processors of a haptic system cause the haptic system to perform operations, wherein the haptic system comprises a housing and at least a first drive unit and a second drive unit, the first drive unit coupled to the housing and comprising a mass movable relative to the housing, the second drive unit coupled to the housing and comprising a mass movable relative to the housing, the first drive unit and the second drive unit forming a first set of drive units, the haptic system comprising a second set of drive units including at least a third drive unit and a fourth drive unit, the third drive unit comprising a third mass movable relative to the housing, the fourth drive unit comprising a fourth mass movable relative to the housing, the first and second sets of drive units are spaced from one another and wherein the operations comprise:

controlling the first drive unit and the second drive unit to generate a haptic signal by causing a net force to be exerted on the housing of the haptic system by the first drive unit and the second drive unit; and controlling the first set of drive units and the second set of drive units to provide a haptic signal at a position between the first set of drive units and the second set of drive units.

16. The one or more computer-readable media of claim 15, wherein the first drive unit comprises a first speaker diaphragm and the second drive unit comprises a second speaker diaphragm, and the operations further comprise controlling the at least two drive units to generate audio.

17. The one or more computer-readable media of claim 16, wherein the operations comprise controlling the first drive unit and the second drive unit to generate audio and the haptic signal simultaneously.

18. The one or more computer-readable media of claim 17, wherein the operations further comprise:

determining that an excursion of the first drive unit and the second drive unit exceeds a threshold; and responsively reducing a magnitude of the haptic signal.

19. The one or more computer-readable media of claim 15, wherein the first drive unit and the second drive unit are positioned to generate the haptic signal substantially without sound by cancellation of sound waves generated by the speaker diaphragms.

20. The one or more computer-readable media of claim 15, wherein the operations further comprise controlling at least the first set of drive units and the second set of drive units to provide at least two simultaneous haptic signals at different positions.

* * * * *